(12) United States Patent
Liu et al.

(10) Patent No.: US 10,493,618 B1
(45) Date of Patent: Dec. 3, 2019

(54) MULTI-AXIS MECHANICAL GRIPPER WITH SYMMETRICALLY FIXED PAIR OF RACKS

(71) Applicant: Jiangsu Fine Storage Information Technology Co., Ltd., Changshu (CN)

(72) Inventors: Yilin Liu, Wuhan (CN); Hui Luo, Changsha County (CN)

(73) Assignee: Jiangsu Fine Storage Information Technology Co., Ltd., Changshu (CN)

( * ) Notice: Subject to any disclaimer, the term of this patent is extended or adjusted under 35 U.S.C. 154(b) by 0 days.

(21) Appl. No.: 16/196,302

(22) Filed: Nov. 20, 2018

(51) Int. Cl.
  *B25J 9/02* (2006.01)
  *B65G 1/04* (2006.01)
  *G11B 7/26* (2006.01)

(52) U.S. Cl.
  CPC ............ *B25J 9/023* (2013.01); *B65G 1/0407* (2013.01); *B25J 9/02* (2013.01); *B65G 2201/022* (2013.01); *G11B 7/265* (2013.01)

(58) Field of Classification Search
  CPC ....................................................... B25J 5/02
  See application file for complete search history.

(56) References Cited

U.S. PATENT DOCUMENTS

| 4,531,884 | A | * | 7/1985 | Russell | B25J 5/02 |
|---|---|---|---|---|---|
| | | | | | 192/48.9 |
| 4,648,774 | A | * | 3/1987 | Dorumsgaard | B23Q 7/04 |
| | | | | | 414/416.01 |
| 5,103,551 | A | * | 4/1992 | Tamura | B23K 37/047 |
| | | | | | 269/152 |
| 10,046,912 | B2 | * | 8/2018 | Behling | B66F 9/07513 |
| 10,327,366 | B2 | * | 6/2019 | Yamazaki | G11B 23/0323 |
| 2008/0145195 | A1 | * | 6/2008 | Sacerdoti | B21D 43/05 |
| | | | | | 414/225.01 |
| 2014/0112742 | A1 | * | 4/2014 | Yang | B66F 9/07 |
| | | | | | 414/222.13 |
| 2017/0066592 | A1 | * | 3/2017 | Bastian, II | B66F 9/063 |

* cited by examiner

*Primary Examiner* — Gerald McClain
(74) *Attorney, Agent, or Firm* — Maier & Maier, PLLC

(57) ABSTRACT

A multi-axis mechanical gripper includes a bottom moving mechanism, a vertical moving mechanism slidably connected to the bottom moving mechanism, horizontal moving mechanisms slidably connected to the vertical moving mechanism, and clamping devices slidably connected to the horizontal moving mechanisms and used for clamping materials. The clamping devices can be adjusted to the position of to-be-clamped materials through the cooperation of the bottom moving mechanism, the vertical moving mechanism and the horizontal moving mechanisms. The mechanical gripper is able to move along multiple axes, thereby being high in transfer efficiency, simple in structure, high in automation degree and capable of effectively relieving the labor intensity of workers.

9 Claims, 9 Drawing Sheets

MULTI-AXIS MECHANICAL GRIPPER WITH SYMMETRICALLY FIXED PAIR OF RACKS

FIELD

The invention relates to the technical field of mechanical grippers, in particular to a multi-axis mechanical gripper.

BACKGROUND

With the rapid development of economy, automatic equipment has been widely used for production in various manufacturing industries. For instance, CDs usually need to be taken and placed in the manufacturing process; however, CDs are nowadays generally taken and placed manually, which results in inconvenience in operation, low production efficiency, high labor intensity of workers and even damage to the surfaces of the CDs. In view of this, ordinary mechanical grippers are always used for transferring at present. However, existing mechanical grippers are poor in flexibility and low in transfer efficiency, which is not beneficial to the improvement of the processing efficiency; and meanwhile, due to the complex structure and high integration level of the existing mechanical grippers, manpower and material consumption for maintenance of the existing mechanical grippers is high, which results in a high cost and is not beneficial to the development of enterprises.

SUMMARY

To overcome the defects of the prior art, the invention provides a multi-axis mechanical gripper, which is able to rapidly operate along multiple axes and is high in transfer efficiency.

The following technical solution is adopted by the invention to settle the technical issue: a multi-axis mechanical gripper comprises a bottom moving mechanism, a vertical moving mechanism, horizontal moving mechanisms and clamping devices. The vertical moving mechanism is slidably connected to the bottom moving mechanism. The horizontal moving mechanisms are slidably connected to the vertical moving mechanism. The clamping devices are slidably connected to the horizontal moving mechanisms and are used for clamping materials.

By adoption of the above solution, the bottom moving mechanism drives the vertical moving mechanism to move leftwards or rightwards; when moving to a material storage position, the vertical moving mechanism drives the horizontal moving mechanisms connected thereto to start to move upwards or downwards, so that the vertical distance between the horizontal moving mechanisms and the material storage position is adjusted; when adjusted to positions over the material storage position, the horizontal moving mechanisms drive the clamping devices connected thereto to start to move towards the material storage position; when moved to positions above the material storage position, the clamping devices start to clamp materials; after the materials are clamped by the clamping devices, the bottom moving mechanism drives the vertical moving mechanism to move towards a material detection position, and then the horizontal moving mechanisms and the clamping devices connected to the vertical moving mechanism are driven to move towards the material detection position; when moving to the front side of the material detection position, the vertical moving mechanism drives the horizontal moving mechanisms to move upwards or downwards, so that the vertical distance between the horizontal moving mechanisms and the material detection position is adjusted, and when adjusted to positions over the material detection position, the horizontal moving mechanisms drive the clamping devices connected thereto to start to move towards the material detection position; when moved to the material detection position, the clamping devices place the materials on the material detection position. The structure is simple, the flexibility is high, the automation degree is high, the labor intensity of workers is effectively relieved, and damage to materials caused by manual taking or placing of the materials are avoided.

Preferably, the horizontal moving mechanisms include a first horizontal moving mechanism and a second horizontal moving mechanism. The first horizontal moving mechanism and the second horizontal moving mechanism are symmetrically arranged on two sides of the vertical moving mechanism A middle transfer device is arranged between the first horizontal moving mechanism and the second horizontal moving mechanism and is located on the upper portion of the vertical moving mechanism.

By adoption of the above solution, under the condition where a processing device used for processing the materials is located on one side of the first horizontal moving mechanism, materials near the first horizontal moving mechanism are directly clamped by the clamping device on the first horizontal clamping mechanism when needed and then are placed on the processing device to be processed; if the materials are located at a position out of reach of the first horizontal moving mechanism, the materials can be clamped by the clamping device on the second horizontal moving mechanism to be placed on the middle transfer device, the materials placed on the middle transfer device are then clamped by the first horizontal moving mechanism and are placed on the processing device to be processed; and through the cooperation of the first horizontal moving mechanism and the second horizontal moving mechanism, the materials can be taken and placed in a shorter time, thus, improving material transfer efficiency and effectively improving production efficiency.

Preferably, the middle transfer device comprises a first motor and a carrier. The output end of the first motor is connected with a sliding ring. The sliding ring is connected with the carrier. Troughs are arranged on the carrier and are used for storing materials.

By adoption of the above solution, the carrier can be driven by the first motor to rotate by 360° to reach a position where the first horizontal moving mechanism and the second horizontal moving mechanism can clamp materials from the carrier or place materials onto the carrier, thus, improving the transfer efficiency of the materials.

Preferably, the vertical moving mechanism comprises a support and a second motor. A first lead screw and a second lead screw are respectively arranged on the upper portion and the lower portion of the support. The first lead screw is connected with the second motor. The second motor is fixed to the lower portion of the support. A first belt wheel and a second belt wheel are respectively arranged at two ends of the first lead screw. A third belt wheel and a fourth belt wheel are respectively arranged at two ends of the second lead screw. A first synchronous belt is connected between the first belt wheel and the third belt wheel. A second synchronous belt is connected between the second belt wheel and the fourth belt wheel. Two ends of each horizontal moving mechanism are respectively connected with the first synchronous belt and the second synchronous belt. First guide rails are symmetrically arranged on two side edges of the support. First sliding blocks are slidably connected to the first guide rails and are fixed to the horizontal moving mechanisms.

Preferably, the vertical moving mechanism further comprises connecting pieces symmetrically fixed to two ends of the horizontal moving mechanisms. Each connecting piece comprises a first clamping block and a second clamping block. Each second clamping block has one side connected with the corresponding horizontal moving mechanism and one side matched with the corresponding first clamping block to be fixed to the first synchronous belt.

By adoption of the above solution, the first clamping blocks and the second clamping blocks are matched to be fixed to the first synchronous belt, so that the horizontal moving mechanisms have the same speed as the first synchronous belt and thus can move upwards or downwards on the support more steadily.

Preferably, the first horizontal moving mechanism and the second horizontal moving mechanism each comprise a fixing plate and a third motor. A driving belt wheel and a driven belt wheel are respectively arranged at two ends of each fixing plate. A third synchronous belt is connected between each driving belt wheel and the corresponding driven belt wheel and is connected with the clamping devices. The third motors are connected with the driving belt wheels and are fixed to the fixing plates. Second guide rails are symmetrically arranged on each fixing plate. Second sliding blocks are slidably connected to the second guide rails and are connected with the clamping devices.

By adoption of the above solution, after the horizontal moving mechanisms are adjusted by the vertical moving mechanism to proper positions, the third motors are started to drive the driving belt wheels to rotate, so that the third synchronous belts start to operate, and at this moment, the clamping devices connected to the third synchronous belts rotate along with the third synchronous belts; when the clamping devices move to a position where materials can be clamped, the third motors stop operating, and at this moment, the clamping devices stop moving forwards and start to clamp the materials; and after the materials are clamped by the clamping devices, the third motors are started, and the clamping devices are driven by the third synchronous belts to move towards a material detection position. In this way, the automation degree is high, and the labor intensity of workers is effectively relieved; and meanwhile, the clamping devices are connected to the synchronous belts, so that the clamping devices have the same speed as the synchronous belts and thus can move more steadily and operate more rapidly.

Preferably, each clamping device comprises a supporting frame and a fourth motor, wherein first connecting plates are connected two side edges of the supporting frame, and hook pieces are fixed to the ends of the first connecting plates; a vertical output shaft of the fourth motor downwards penetrates through the supporting frame and is connected with a sliding ring, the lower portion of the sliding ring is connected with a second connecting plate, and the other end of the second connecting plate is connected with a clamp.

Preferably, the bottom moving mechanism comprises a bottom plate, a mounting plate and a pair of racks symmetrically fixed to the bottom plate. The mounting plate is located above the bottom plate. A third guide rail and a fourth guide rail are symmetrically arranged on the bottom plate. Third sliding blocks are slidably connected to the third guide rail and the fourth guide rail and are connected with the lower surface of the mounting plate. Fifth motors used for driving the connecting plates to slide are arranged on the mounting plate. The output ends of the fifth motors are connected with gears. The gears are engaged with the racks located between the third guide rail and the fourth guide rail. The upper surface of the mounting plate is connected with the vertical moving mechanism.

Preferably, the bottom moving mechanism further comprises a fifth guide rail located between the two racks and fixed to the bottom plate. A fourth sliding block is slidably connected to the fifth guide rail and is connected with the lower surface of the mounting plate.

By adoption of the above solution, the second sliding blocks are connected to the middle of the mounting plate and slide on the third guide rail, so that the weight of the mechanical gripper connected to the mounting plate is prevented from being too heavy, which may otherwise cause instability and damage to the mounting plate when the mounting plate moves.

Preferably, foot pads are connected to the lower surface of the bottom plate.

Compared with the prior art, the invention has the following beneficial effects: the bottom moving mechanism drives the vertical moving mechanism to move leftwards or rightwards, so that the front-back position of the vertical moving mechanism is adjusted; after the vertical and front-back positions are adjusted, the vertical moving mechanism drives the horizontal moving mechanisms to move upwards or downwards, so that the height of the horizontal moving mechanisms is adjusted; after the height of the horizontal moving mechanisms is adjusted, the horizontal moving mechanisms drive the clamping devices to move, so that the positions of the clamping devices with respect to materials are adjusted; after being adjusted to positions where the materials can be clamped by the clamping devices, the clamping devices start to clamp the materials; then the materials clamped by the clamping devices are placed to a required position through the cooperation of the horizontal moving mechanisms, the vertical moving mechanism and the bottom moving mechanism, and thus, the process of taking and placing the materials is completed. The mechanical gripper is adjustable, high in flexibility and automation degree, and capable of effectively relieving the labor intensity of workers and avoiding damage to materials caused by manual taking and placing of the materials; and meanwhile, the mechanical gripper is driven electrically as well as through the synchronous belts, thereby being simple in structure, low in cost and capable of moving more steadily.

BRIEF DESCRIPTION OF THE FIGURES

The invention is further described below with reference to the accompanying drawings and embodiments.

1—first horizontal moving mechanism; 2—vertical moving mechanism; 201—support; 202—third belt wheel; 203—first sliding block; 204—first belt wheel; 205—first synchronous belt; 206—second motor; 207—first lead screw; 208—second belt wheel; 209—second synchronous belt; 210—fourth belt wheel; 211—second lead screw; 212—first guide rail; 213—tooth groove; 214—first clamping block; 215—second clamping block; 3—middle transfer device; 301—carrier; 302—trough; 303—sliding ring; 304—first motor; 4—second horizontal moving mechanism; 401—third motor; 402—drag chain groove; 403—second sliding block; 404—second guide rail; 405—driven belt wheel; 406—third synchronous belt; 407—driving belt wheel; 408—fixing plate; 5—clamping device; 501—fourth motor; 502—sliding ring; 503—second connecting plate; 504—supporting frame; 505—first connecting plate; 506—hook piece; 6—bottom moving mechanism; 601—rack; 602—fifth motor; 603—mounting plate; 604—third guide rail; 605—foot pad; 606—bottom plate; 607—fifth guide rail; 608—fourth guide rail; 609—fourth sliding block; 610—third sliding block; 611—gear.

DETAILED DESCRIPTION

The invention is further expounded below with reference to the accompanying drawings. These accompanying drawings are all simplified schematic views used to illustratively explain the basic structure of the invention and thus only show components involved in the invention.

What needs to be pointed out is that terms used for indicating directional or positional relations, such as "center", "upper", "lower", "left", "right", "vertical", "horizontal", "inner" and "outer", are only used to facilitate and simplify description of the invention based on the directional or positional relations shown in the accompanying drawings, but do not indicate or imply that devices or elements referred to should have specific directions or should be configured or operated in specific directions, and thus, these terms should not be regarded as limitations to the invention. Terms such as "first", "second" and "third" are only used for description and should not be interpreted as indications or implications of relative importance. In addition, unless otherwise clearly specified or restricted, terms such as "mount", "connect" and "connection" should be generally understood, for instance, "connection" can refer to fixed connection, detachable connection or integrated connection, or refer to mechanical connection or electrical connection, or refer to direct connection or intermediate connection through intermediate media, or refer to internal communication between two elements. Those skilled in this field can appreciate the specific meanings of these terms in the invention according to specific conditions.

Figure 1:
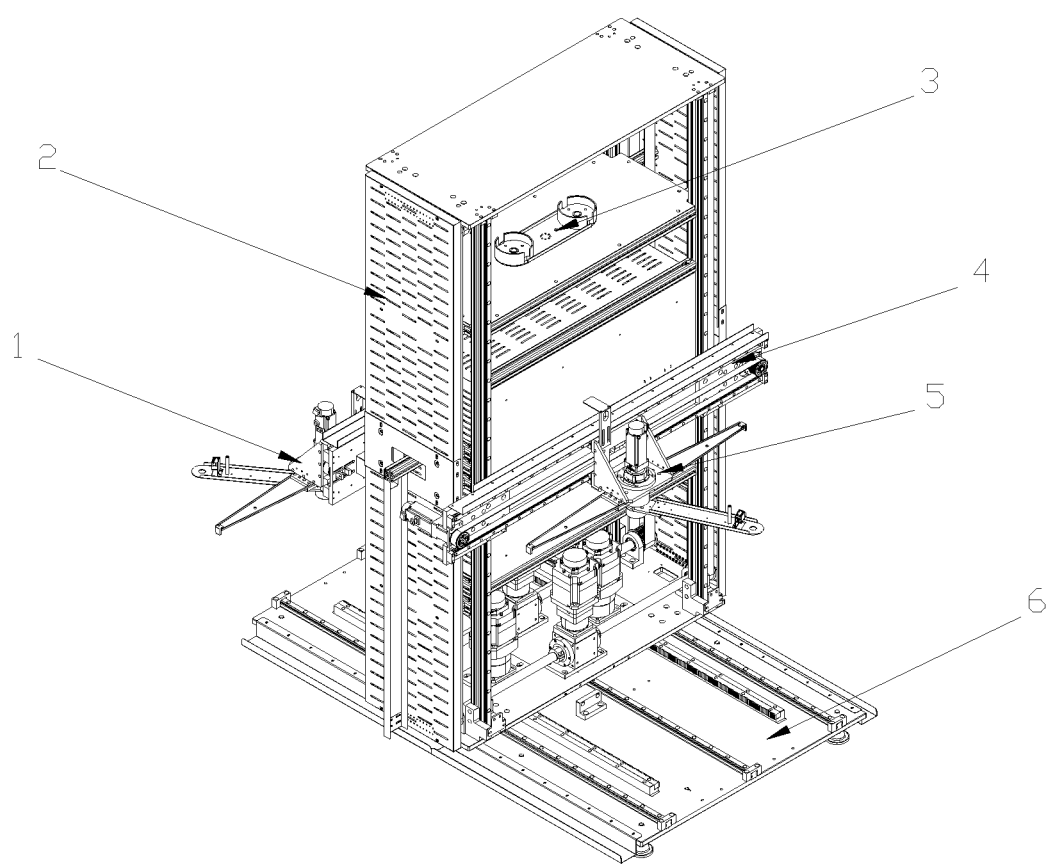
FIG. 1 is a structural view of a multi-axis mechanical gripper of the invention.
Figure 2:
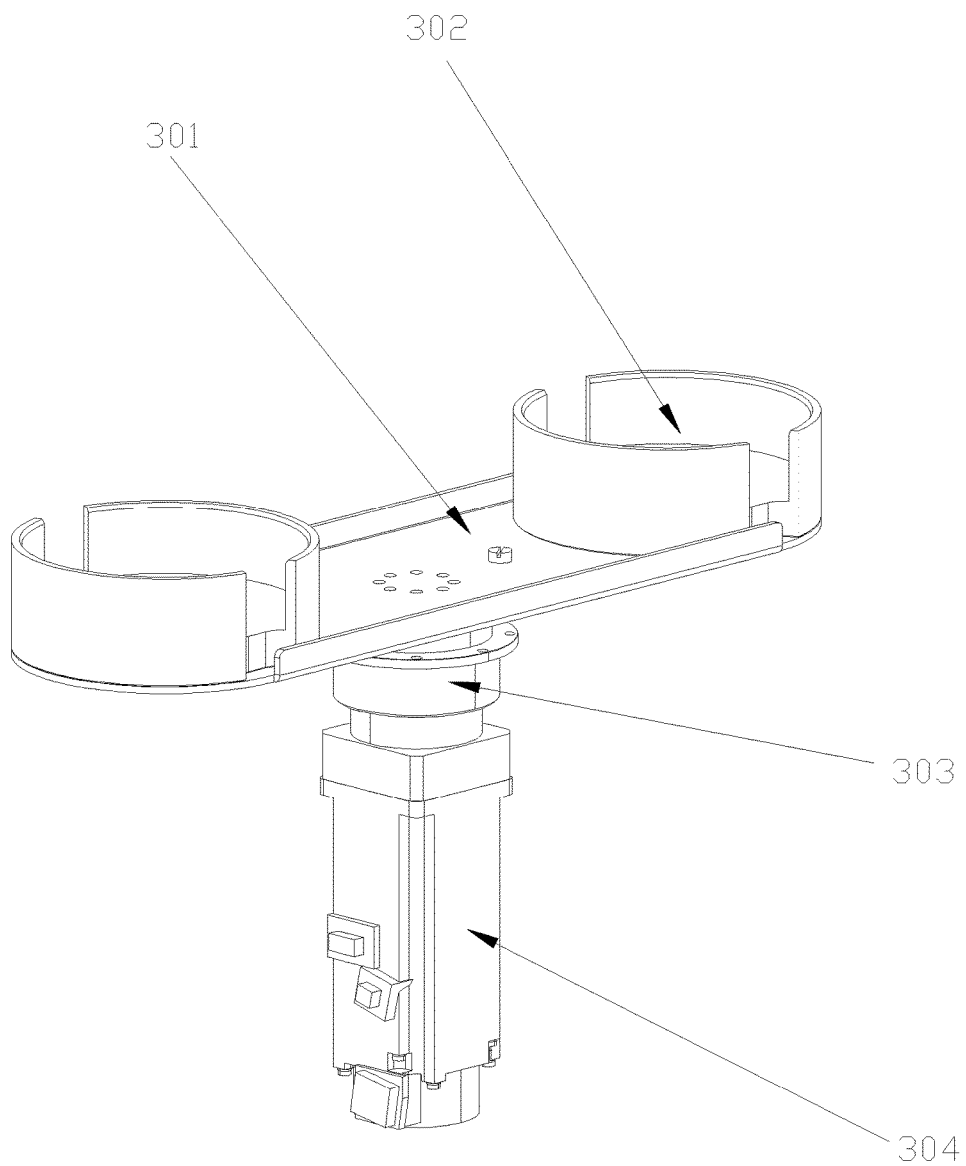
FIG. 2 is a schematic view of a middle transfer device of the multi-axis mechanical gripper of the invention.
Figure 3:
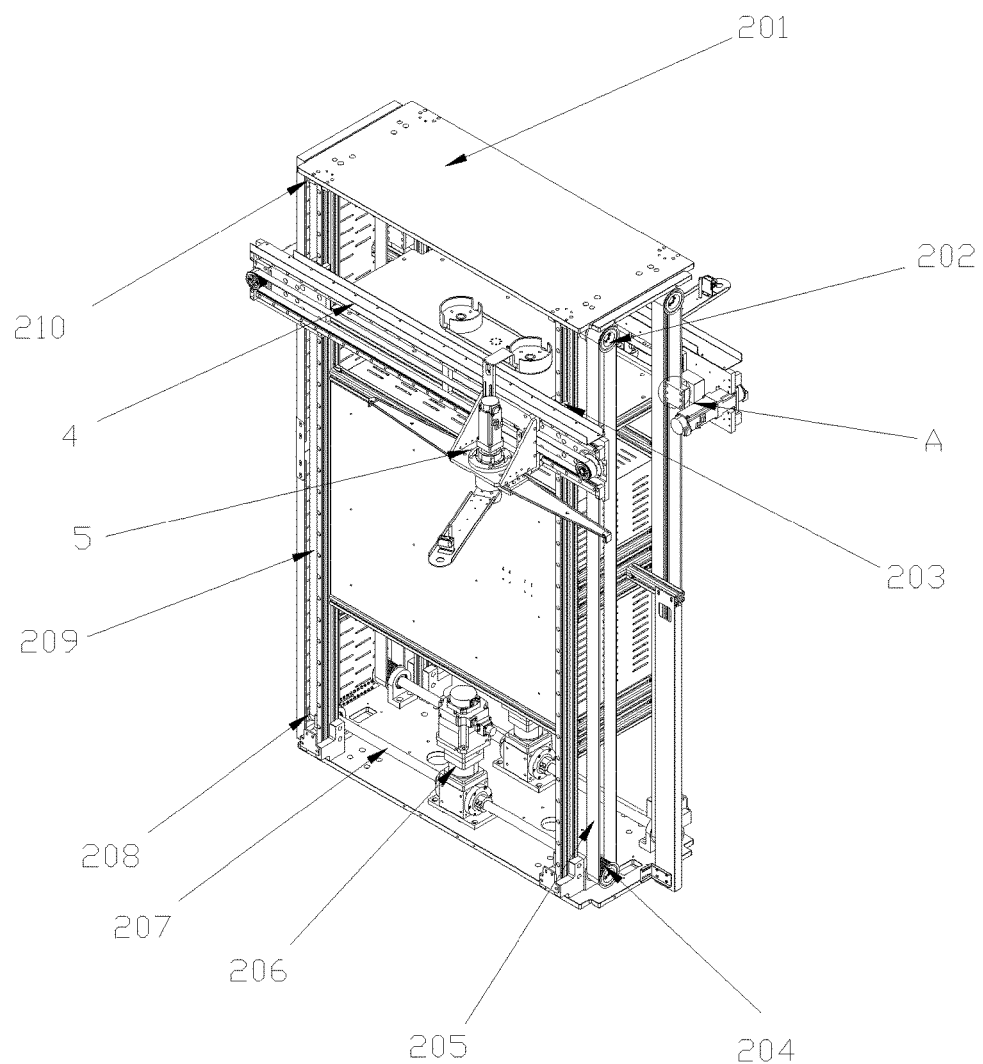
FIG. 3 is a schematic view of a vertical moving mechanism of the multi-axis mechanical gripper of the invention.
Figure 4:
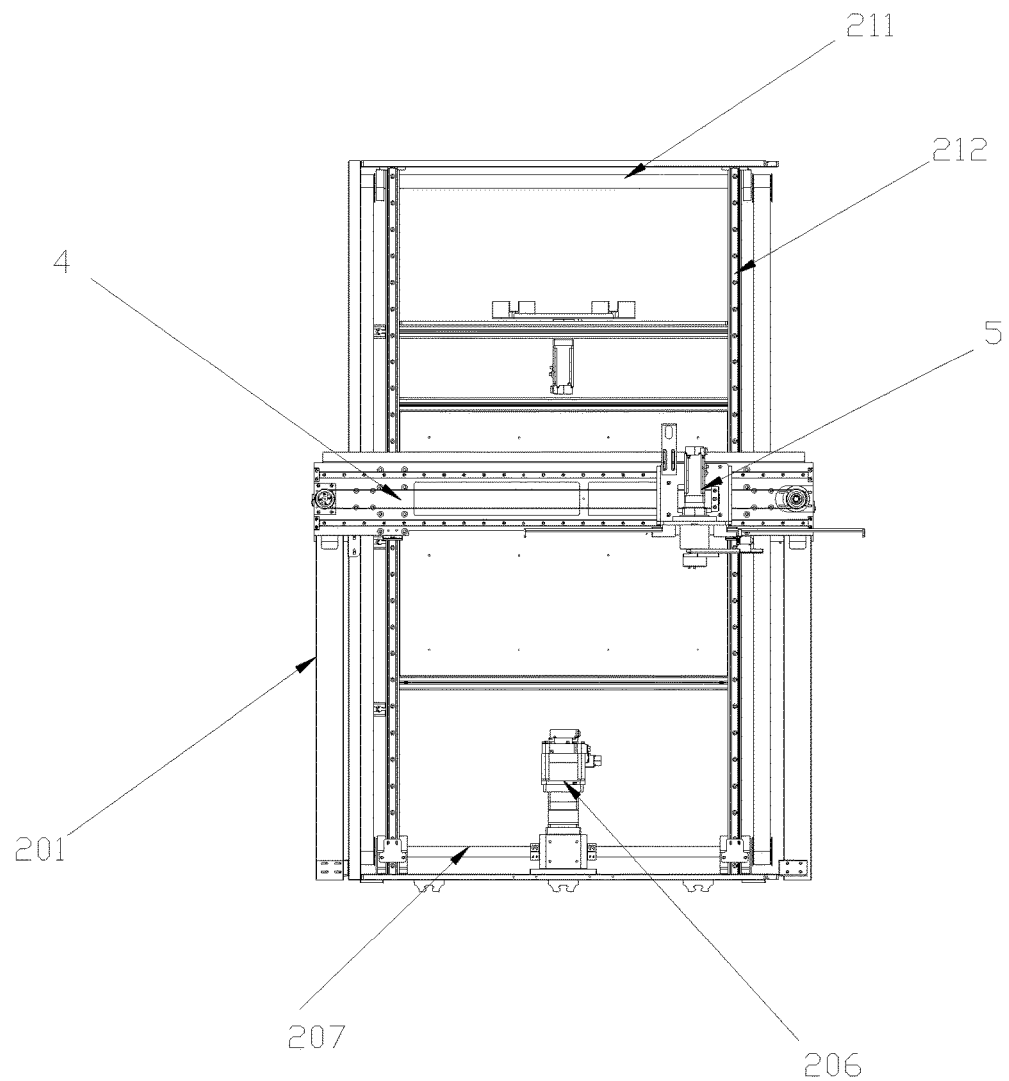
FIG. 4 is a front view of the vertical moving mechanism of the multi-axis mechanical gripper of the invention.
Figure 5:
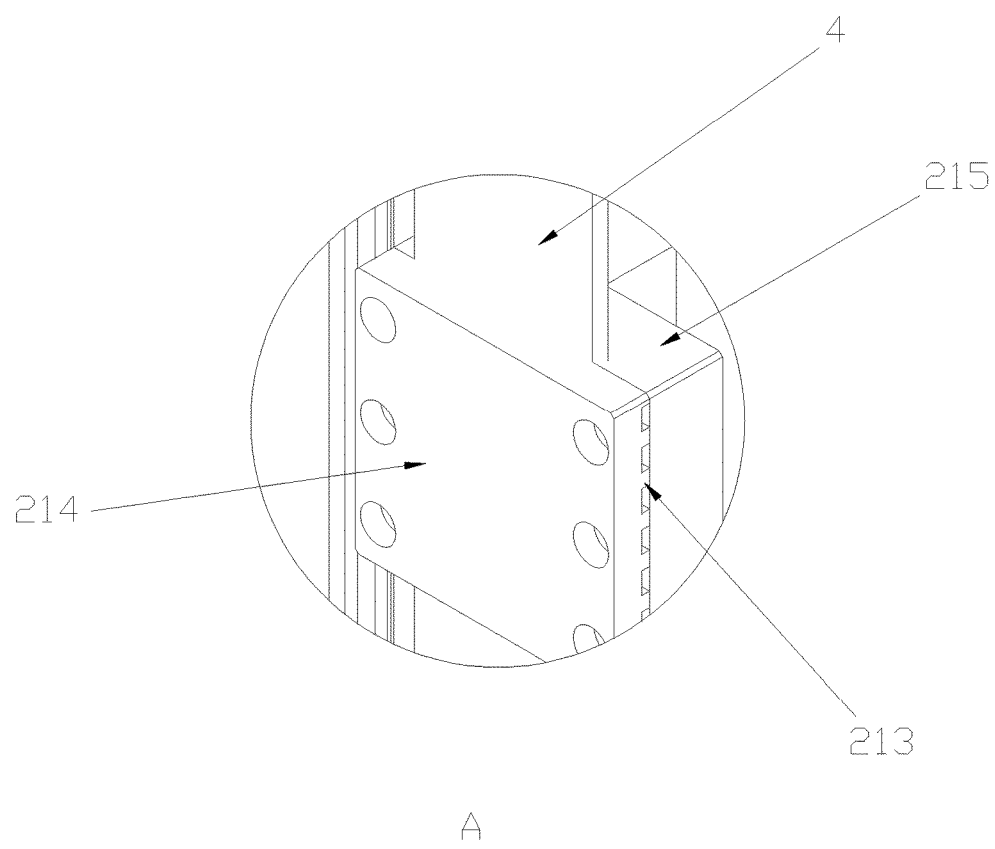
FIG. 5 is an enlarged view of part A in FIG. 3.
Figure 6:
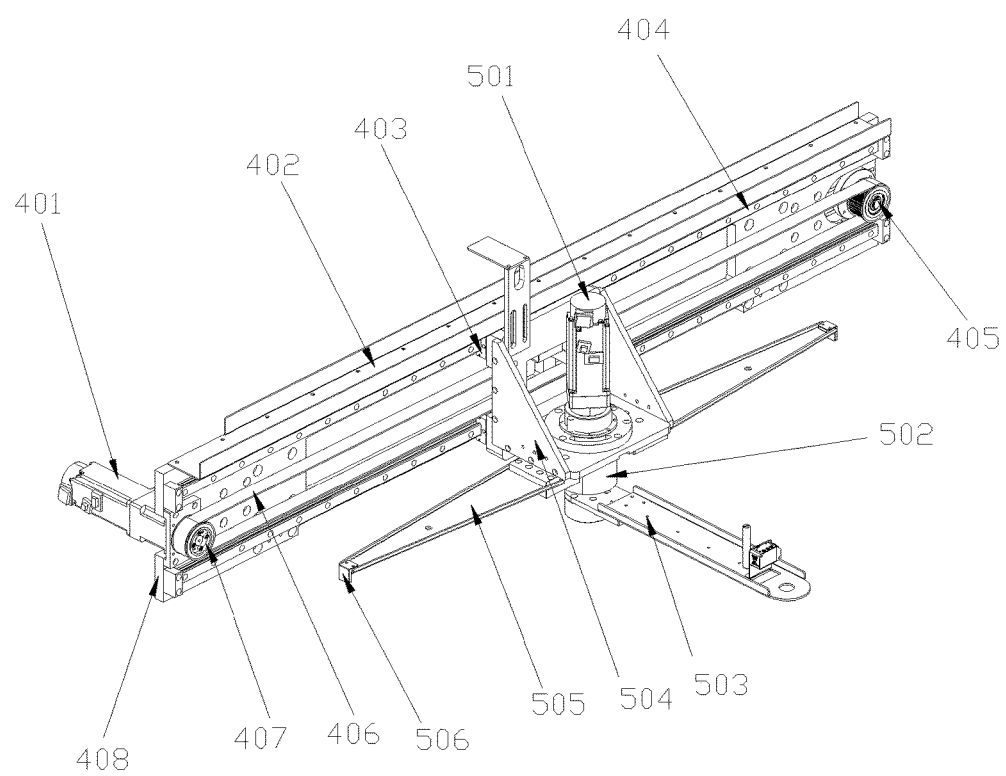
FIG. 6 is a connection view of a horizontal moving mechanism and a clamping device of the multi-axis mechanical gripper of the invention.
Figure 7:
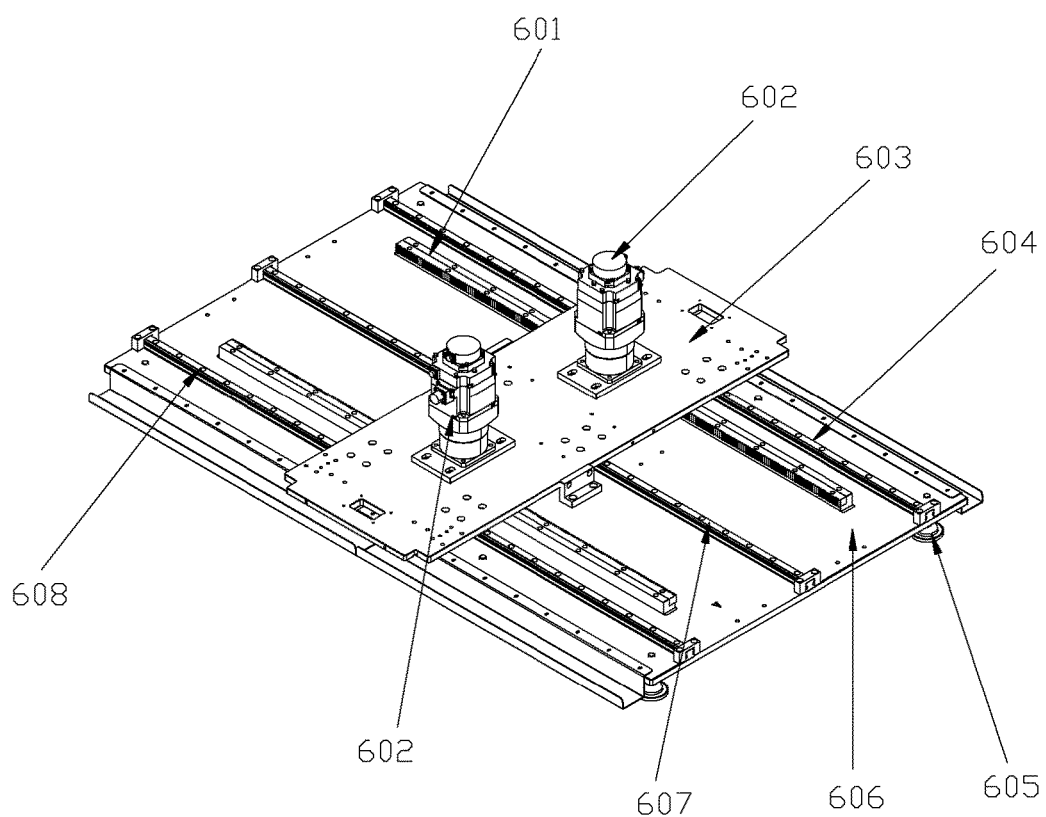
FIG. 7 is a schematic view of a bottom moving mechanism of the multi-axis mechanical gripper of the invention.
Figure 8:
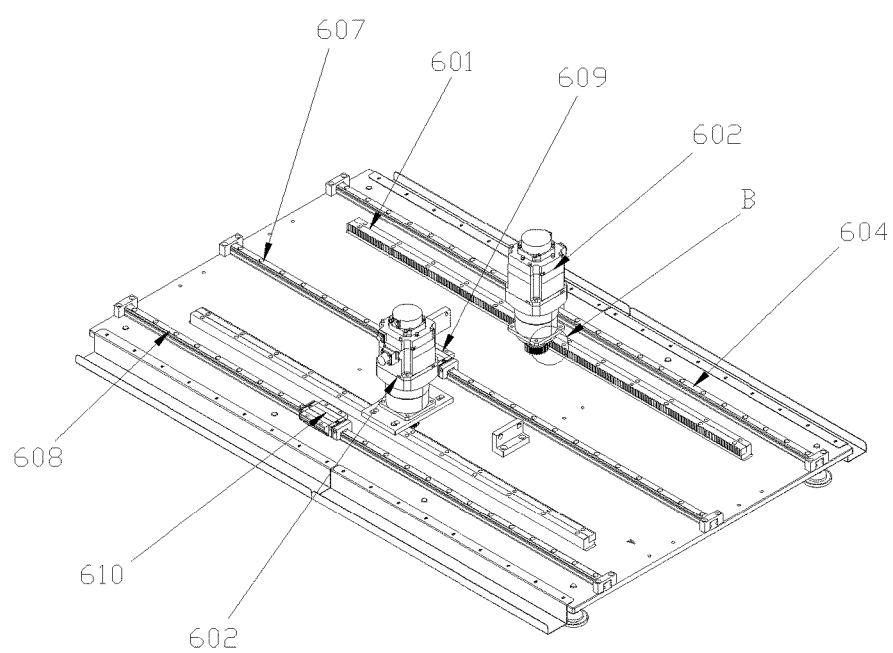
FIG. 8 is a schematic view of the bottom moving mechanism of the multi-axis mechanical gripper after a mounting plate is removed.
Figure 9:
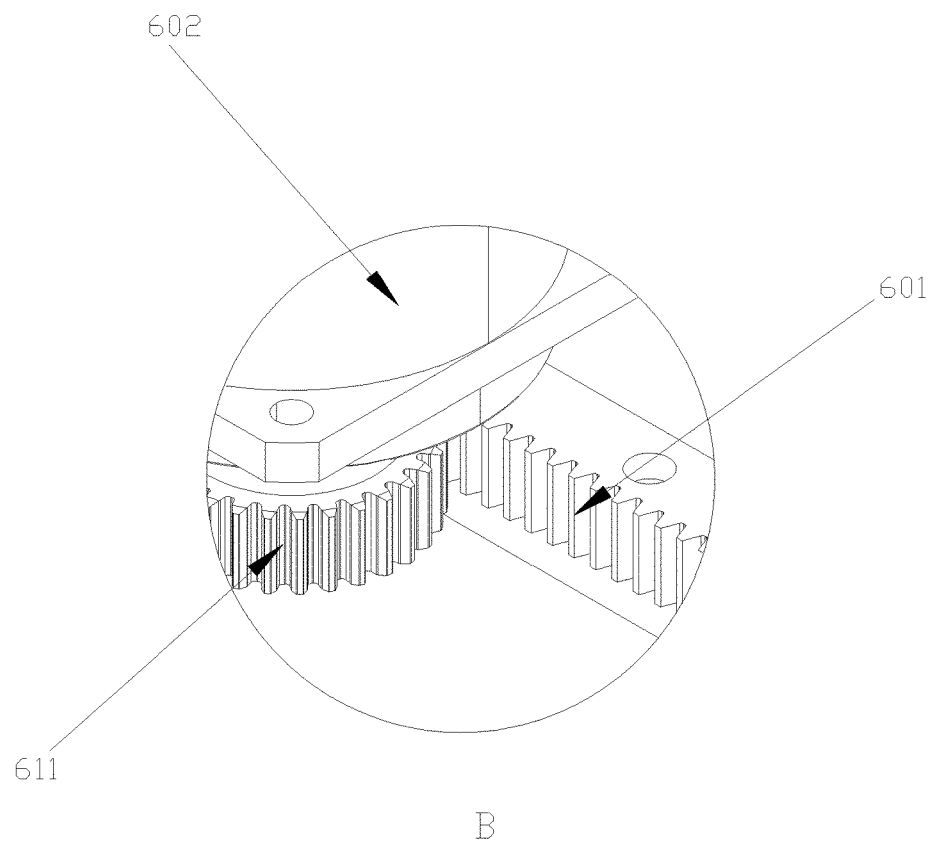
FIG. 9 is an enlarged view of part B in FIG. 8.

Referring FIG. 1 and FIG. 2, a multi-axis mechanical gripper comprises a bottom moving mechanism 6, a vertical moving mechanism 2, horizontal moving mechanisms and clamping devices 5. The vertical moving mechanism 2 is slidably connected to the bottom moving mechanism 6. The horizontal moving mechanisms are slidably connected to the vertical moving mechanism 2 and include a first horizontal moving mechanism 1 and a second horizontal moving mechanism 4. The first horizontal moving mechanism 1 and the second horizontal moving mechanism 4 are symmetrically arranged on two sides of the vertical moving mechanism 2. A middle transfer device 3 is arranged between the first horizontal moving mechanism 1 and the second horizontal moving mechanism 4 and is located on the upper portion of the vertical moving mechanism 2. The clamping devices 5 are slidably connected to the first horizontal moving mechanism 1 and the second horizontal moving mechanism 4 and are used for clamping materials.

Particularly, the middle transfer device 3 comprises a first motor 304 and a carrier 301. The output end of the first motor 304 is connected with a sliding ring 303. The sliding ring 303 is connected with the lower end of the carrier 301. Two troughs 302 are arranged on the carrier 301 and are used for storing materials. The first motor is a gear motor.

Particularly, the vertical moving mechanism 2 comprises a support 201 and a second motor 206. A first lead screw 207 and a second lead screw 211 are respectively arranged on the upper portion and the lower portion of the support 201 and are fixed to the support 201 through lead screw holders. The first lead screw 207 is located under the second lead screw 211 and has two ends respectively connected with a first belt wheel 204 and a second belt wheel 208. The first lead screw 207 is connected with the second motor 206. The second motor 206 is fixed to the lower portion of the support 201. The second lead screw 211 has two ends respectively connected with a third belt wheel 202 and a fourth belt wheel 210. A first synchronous belt 205 is connected between the first belt wheel 204 and the third belt wheel 202. A second synchronous belt 209 is connected between the second belt wheel 208 and the fourth belt wheel 210. Each horizontal moving mechanism has two ends respectively connected with the first synchronous belt 205 and the second synchronous belt 209. First guide rails 212 are symmetrically arranged on two side edges of the support 201. First sliding blocks 203 are slidably connected to the first guide rails 212 and are fixed to the horizontal moving mechanisms.

Particularly, the vertical moving mechanism 2 further comprises connecting pieces symmetrically fixed to two ends of the horizontal moving mechanisms. Each connecting piece comprises a first clamping block 214 and a second clamping block 215. The right sides of the second clamping blocks 215 are connected with the horizontal moving mechanisms. The left sides of the second clamping blocks 215 are matched with the first clamping blocks 214 so as to be fixed to the first synchronous belt 205. Tooth grooves 213 are formed in surfaces, in contact with the first synchronously belt 205, of the first clamping blocks 214, and the first synchronous belt 205 is provided with tooth profiles matched with the tooth grooves, so that the horizontal moving mechanisms have the same speed as the first synchronous belt 205 and can move upwards or downwards more steadily on the support 201. Similarly, the second synchronous belt 209 is connected with the horizontal moving mechanisms through connecting pieces of the same structure.

Particularly, the first horizontal moving mechanism 1 and the second horizontal moving mechanism 4 each comprise a fixing plate 408 and a third motor 401. A driving belt wheel 407 and a driven belt wheel 405 are respectively arranged at two ends of each fixing plate 408. A third synchronous belt 406 is connected between each driving belt wheel 407 and the corresponding driven belt wheel 405. The third synchronous belts 406 are connected with the clamping devices 5. The third motors 401 are connected with the driving belt wheels 407 and are fixed to the fixing plates 408. Second guide rails 404 are symmetrically arranged on each fixing plate 408. Second sliding blocks 403 are slidably connected to the second guide rails 404 and are connected with the clamping devices 5.

Particularly, each clamping device 5 comprises a supporting frame 504 and a fourth motor 501. First connecting plates 505 are connected to two side edges of each supporting frame 504. Hook pieces 506 are fixed to the ends of the first connecting plates 505 and are shaped like Arabic numeral "7". Each hook piece 506 has an end fixed to the end of the corresponding first connecting plate 505 through a bolt. The first connecting plates 505 gradually become narrower from the ends connected with the supporting frames 504 to the other ends. The fourth motors 501 are perpendicularly fixed to the supporting frames 504. Output shafts of the fourth motors 501 perpendicularly penetrate through the supporting frames 504 and are connected with sliding rings 502. The lower portions of the sliding rings 502 are connected with second connecting plates 503. The other ends of the second connecting plates 503 are connected with clamps.

Particularly, the bottom moving mechanism 6 comprises a bottom plate 606, a mounting plate 603 and a pair of racks 601 symmetrically fixed to the bottom plate 606. The mounting plate 603 is located above the bottom plate 606. A third guide rail 604 and a fourth guide rail 608 are symmetrically arranged on the bottom plate 606. Third sliding blocks 610 are slidably connected to the third guide rail 604 and the fourth guide rail 608 and are connected with the lower surface of the mounting plate 603. Fifth motors 602 used for driving the mounting plate to slide are arranged on the mounting plate 603. Output shafts of the fifth motors 602 are connected with gears 611 which are engaged with the racks 601. The racks 601 are located between the third guide rail 604 and the fourth guide rail 608. The upper surface of the mounting plate 603 is connected with the lower surface of the support 201.

Particularly, the bottom moving mechanism 6 further comprises a fifth guide rail 607 located between the two racks 601 and is fixed to the bottom plate 606. A fourth sliding block 609 is slidably connected to the fifth guide rail 607 and is connected with the lower surface of the mounting plate 603.

Particularly, four foot pads 605 are connected to the lower surface of the bottom plate 606 and are distributed at four corners of the bottom plate 606, so that the bottom plate 606 is prevented from sliding when placed on the ground, which may otherwise affect the precision of the mechanical gripper.

Operating principle: materials are placed in a storage cabinet, the fifth motors 602 are then controlled by a controller to start to drive the gears 611 to be engaged with the racks 601 for transmission, so that the mounting plate 603 start to move leftwards or rightwards, and then, the vertical moving mechanism 2, the horizontal moving mechanisms and the clamping mechanisms 5 connected to the mounting plate 603 are made to move towards the storage cabinet storing the materials; when the mounting plate 603 moves to the front side of the storage cabinet, the fifth motors 602 stop rotating, so that the vertical moving mechanism 2, the horizontal moving mechanisms and the clamping device 5 are located on the side faces of the storage cabinet; afterwards, the second motor 206 is started to drive the first lead screw 207 and the second lead screw 211 to rotate, so that the first synchronous belt 205 and the second synchronous belt 209 are driven to operate, at this moment, the horizontal moving mechanisms connected with the first synchronous belt 205 and the second synchronous belt 209 start to move upwards or downwards, and when the horizontal moving mechanisms move to an altitude corresponding to the to-be-clamped materials in the storage cabinet, the second motor 205 stops rotating; at this moment, the third motors 401 start to rotate to drive the driving belt wheels 407 to rotate, so that the third synchronous belts 406 start to operate to drive the clamping devices 5 connected to the third synchronous belts 406 to move towards the storage cabinet, and when the clamping devices 5 move to positions above the to-be-clamped materials, the third motors 401 stop rotating, the hook pieces 506 hook the carrier where the materials are placed, and then the third motors 401 start to rotate reversely to move the clamping devices 5 away from the storage cabinet, so that the carrier is pulled out by the hook pieces 506; after the carrier is pulled out, the third motors 401 stop rotating, and at this moment, the fourth motors 501 start to rotate to drive the second connecting plates 503 to rotate by 360°; when the second connecting plates 503 rotate to positions above the carrier, the fourth motors 501 stop rotating, and the clamps connected to the second clamping plates 503 start to clamp the materials; after the materials are clamped by the clamps, the fifth motors 602 start to rotate to move the materials clamped by the clamps towards a material detection position; when the clamping devices move to the material detection position, the second motor 206 rotates to move the clamping devices 5 upwards or downwards, and when the clamping devices 5 move to positions above the material detection position, the second motor 206 stops rotating; at this moment, the third motors 401 start to rotate to drive the clamping devices connected to the third synchronous belts 406 to move towards the material detection position, and when the clamping devices 5 move to positions above the material detection position, the third motors 401 stop rotating, and the fourth motors 501 start to rotate to drive the second connecting plates 503 to rotate by 360°; and when the second connecting plates 503 rotate to the material detection position, the materials are released by the clamps and are placed on the material detection position. This process is repeated to take and place materials circularly, so that the automation degree is high, and the labor intensity of workers is effectively relieved.

Under the enlightenment of the above ideal embodiments of the invention, various alterations and modifications can be made by those skilled in this field without deviating from the technological thought of the invention. The technical scope of the invention is by no means limited to the contents in the specification and should be defined in terms of the claims when necessary.

What is claimed is:

1. A multi-axis mechanical gripper, comprising;
    a bottom moving mechanism, a vertical moving mechanism, horizontal moving mechanisms, and clamping devices, wherein the vertical moving mechanism is slidably connected to the bottom moving mechanism, the horizontal moving mechanisms are slidably connected to the vertical moving mechanism, and the clamping devices are slidably connected to the horizontal moving mechanisms and are used for clamping materials;
    wherein the bottom moving mechanism comprises:
        a bottom plate,
        a mounting plate and
        a pair of racks symmetrically fixed to the bottom plate,
    wherein the mounting plate is located above the bottom plate,
    a third guide rail and a fourth guide rail are symmetrically arranged on the bottom plate, third sliding blocks are slidably connected to the third guide rail and the fourth guide rail and are connected with a lower surface of the mounting plate, fifth motors used for driving connecting plates to slide are arranged on the mounting plate, output ends of the fifth motors are connected with gears, the gears are engaged with the racks located between the third guide rail and the fourth guide rail, and an upper surface of the mounting plate is connected with the vertical moving mechanism.

2. The multi-axis mechanical gripper according to claim 1, wherein the horizontal moving mechanisms include a first horizontal moving mechanism and a second horizontal moving mechanism which are symmetrically arranged on two sides of the vertical moving mechanism, and a middle transfer device is arranged between the first horizontal moving mechanism and the second horizontal moving mechanism and is located on an upper portion of the vertical moving mechanism.

3. The multi-axis mechanical gripper according to claim 2, wherein the middle transfer device comprises a first motor and a carrier, an output end of the first motor is connected with a sliding ring, the sliding ring is connected with the carrier, and troughs are arranged on the carrier and are used for storing the materials.

4. The multi-axis mechanical gripper according to claim 1, wherein the vertical moving mechanism comprises a support and a second motor, a first lead screw and a second lead screw are respectively arranged on an upper portion and a lower portion of the support, the first lead screw is connected with the second motor, the second motor is fixed to the lower portion of the support, a first belt wheel and a second belt wheel are respectively arranged at two ends of the first lead screw, and a third belt wheel and a fourth belt wheel are arranged at two ends of the second lead screw; a first synchronous belt is connected between the first belt wheel and the third belt wheel, a second synchronous belt is connected between the second belt wheel and the fourth belt wheel, each said horizontal moving mechanism has two ends respectively connected with the first synchronous belt and the second synchronous belt, first guide rails are symmetrically arranged on two side edges of the support, and first sliding blocks are slidably connected to the first guide rails and are fixed to the horizontal moving mechanisms.

5. The multi-axis mechanical gripper according to claim 4, wherein the vertical moving mechanism further comprises connecting pieces symmetrically fixed to two ends of the horizontal moving mechanisms, each said connecting piece comprises a first clamping block and a second clamping block, and each said second clamping block has one side connected with the corresponding horizontal moving mechanism and one side matched with the corresponding first clamping block to be fixed to the first synchronous belt.

6. The multi-axis mechanical gripper according to claim 1, wherein the first horizontal moving mechanism and the second horizontal moving mechanism each comprise a fixing plate and a third motor, a driving belt wheel and a driven belt wheel are respectively arranged at two ends of each said fixing plate, a third synchronous belt is connected between each said driving belt wheel and the corresponding driven belt wheel and is connected with the clamping devices, each said third motor is connected with the corresponding driving belt wheel and is fixed to the corresponding fixing plate, second guide rails are symmetrically arranged on each said fixing plate, and second sliding blocks are slidably connected to the second guide rails and are connected with the clamping devices.

7. The multi-axis mechanical gripper according to claim 1, wherein each said clamping device comprises a supporting frame and a fourth motor, first connecting plates are connected to two sides of each said supporting frame, hook pieces are fixed to ends of the first connecting plates, a vertical output shaft of each said fourth motor downwards penetrates through the corresponding supporting frame to be connected with a sliding ring, a lower portion of each said sliding ring is connected with a second connecting plate, and each said second connecting plate has an end connected with a clamp.

8. The multi-axis mechanical gripper according to claim 1, wherein foot pads are connected to a lower surface of the bottom plate.

9. The multi-axis mechanical gripper according to claim 1, wherein the bottom moving mechanism further comprises a fifth guide rail located between the two racks and fixed to the bottom plate, a fourth sliding block is slidably connected to the fifth guide rail and is connected with the lower surface of the mounting plate.

* * * * *